US008275493B2

(12) United States Patent
Ruffa

(10) Patent No.: US 8,275,493 B2
(45) Date of Patent: Sep. 25, 2012

(54) BOW RIDING UNMANNED WATER-BORNE VEHICLE

(76) Inventor: Anthony A. Ruffa, Hope Valley, RI (US)

( * ) Notice: Subject to any disclaimer, the term of this patent is extended or adjusted under 35 U.S.C. 154(b) by 609 days.

(21) Appl. No.: 12/462,106

(22) Filed: Jul. 30, 2009

(65) Prior Publication Data

US 2011/0029155 A1 Feb. 3, 2011

(51) Int. Cl.
*G05D 1/00* (2006.01)
(52) U.S. Cl. ......... 701/2; 701/23; 701/24; 701/41; 701/300; 701/302; 114/312; 114/318; 114/322; 114/328; 114/330; 114/21.1; 114/21.2; 114/21.3; 114/258; 114/271; 114/343; 114/242; 114/244; 114/246; 114/382; 342/87; 342/95; 342/103; 340/850; 440/113
(58) Field of Classification Search ............... None
See application file for complete search history.

(56) References Cited

U.S. PATENT DOCUMENTS

| | | | | | |
|---|---|---|---|---|---|
| 3,943,875 | A * | 3/1976 | Sanders | ............... | 114/244 |
| 4,055,138 | A * | 10/1977 | Klein | ............... | 114/244 |
| 4,556,341 | A * | 12/1985 | Ayers | ............... | 405/195.1 |
| 5,253,605 | A * | 10/1993 | Collins | ............... | 114/259 |
| 5,447,115 | A * | 9/1995 | Moody | ............... | 114/312 |
| 5,941,192 | A * | 8/1999 | Tavone et al. | ............... | 114/256 |
| 6,178,914 | B1 * | 1/2001 | Axelsson | ............... | 114/368 |
| 6,269,763 | B1 * | 8/2001 | Woodland | ............... | 114/382 |
| 6,390,012 | B1 * | 5/2002 | Watt et al. | ............... | 114/322 |
| 6,409,122 | B1 * | 6/2002 | Nicolai | ............... | 244/106 |
| 6,600,695 | B1 * | 7/2003 | Nugent et al. | ............... | 367/131 |
| 6,779,475 | B1 * | 8/2004 | Crane et al. | ............... | 114/258 |
| 6,843,198 | B1 * | 1/2005 | Witbeck | ............... | 114/258 |
| 7,025,014 | B1 * | 4/2006 | Forgach et al. | ............... | 114/244 |
| H2173 | H * | 10/2006 | Newborn et al. | ............... | 114/247 |
| 7,156,036 | B2 * | 1/2007 | Seiple | ............... | 114/254 |
| 7,350,475 | B2 * | 4/2008 | Borgwarth et al. | ............... | 114/260 |
| 7,581,507 | B2 * | 9/2009 | Kern | ............... | 114/259 |
| 7,699,015 | B1 * | 4/2010 | Said | ............... | 114/253 |
| 7,798,086 | B2 * | 9/2010 | Ruggaber | ............... | 114/238 |
| 7,854,569 | B1 * | 12/2010 | Stenson et al. | ............... | 405/188 |
| 8,109,223 | B2 * | 2/2012 | Jamieson | ............... | 114/312 |
| 8,145,369 | B1 * | 3/2012 | Tureaud et al. | ............... | 701/21 |
| 8,186,295 | B2 * | 5/2012 | Fournier | ............... | 114/332 |
| 2005/0257731 | A1 * | 11/2005 | Bouchaud et al. | ............... | 114/313 |
| 2007/0203623 | A1 * | 8/2007 | Saunders et al. | ............... | 701/23 |
| 2008/0202405 | A1 * | 8/2008 | Kern | ............... | 114/259 |

\* cited by examiner

*Primary Examiner* — Jonathan M Dager
(74) *Attorney, Agent, or Firm* — James M. Kasischke; Michael P. Stanley; Jean-Paul A. Nasser

(57) ABSTRACT

A system and method are provided for launching and recovering an unmanned, water-born vehicle (UWBV) from a mother ship. The UWBV mimics the behavior of dolphins and is positioned ahead of the ship in preparation for bow riding. The UWBV uses a guidance system to position and keep in the bow wave. A high-frequency (HF) sonar transceiver array aboard the ship computes and sends course corrections to maintain the UWBV within the bow wave. The frequency range of the HF array can be 100 kHz or higher due to the short distance between the ship and the UWBV. Accordingly, the HF array can have a small aperture allowing for accurate bearing resolution. Course corrections can be sent on a near-continuous basis such that changes in thrust and rudder angle can be minimized to allow for accurate control of the UWBV.

12 Claims, 2 Drawing Sheets

BOW RIDING UNMANNED WATER-BORNE VEHICLE

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

Not applicable.

BACKGROUND OF THE INVENTION (1) Field of the Invention

The present invention relates to a recovery and retrieval system for an unmanned, water-borne vehicle.

(2) Description of the Prior Art

Small unmanned systems such as unmanned surface or undersea vehicles, referred to herein as unmanned, water-borne vehicles (UWBVs) are being considered to perform more and more missions currently performed by the UWBV's mother ship. Though small in comparison to manned vehicles, these unmanned vehicles can weigh up to several thousand pounds.

Current launch and recovery techniques from large surface ships for these smaller unmanned systems are manually intensive. The ship usually must slow for significant periods of time to allow the UWBVs to be launched or recovered. Alternatively, the UWBVs may have to be recovered onto inflatable, or other auxiliary boats that are manned and launched from the mother ship.

Onboard the auxiliary boat, personnel must physically lift the UWBVs from the water. Depending on the sea state and/or the hostile nature of the deploying environment, launch and recovery from auxiliary boats places personnel in harms way and can significantly impact large ship positioning and operations.

Current and planned automated recovery systems involve outfitting the mother or recovery ship with a recovery arm and capture head that can move rapidly in response to tracked relative vehicle motions. However, due to the limited range of motion of the arm and head, operation is limited to low sea states, even though recovery is often required in high sea state conditions.

A need therefore exists for a system and method that can be used to launch and recover UWBVs from the mother ship without the need for auxiliary boats and having the ability to be used in comparatively high sea state conditions.

SUMMARY OF THE INVENTION

It is therefore a general purpose and object of the present invention to provide systems and methods of use for launching and recovering a UWBV from a mother ship without the need for auxiliary boats and for lessening the relative motion between the mother ship and the UWBV.

In order to attain the object described, a UWBV is provided that can be maneuvered into the bow wave of the mother ship. The UWBV mimics the behavior of dolphins by being positioned, or positioning itself, twenty to thirty feet ahead of the ship in preparation for bow riding. As the mother ship approaches under speed, the UWBV uses a guidance system to position and keep in the bow wave. Bow riding can minimize the relative motion to within the range of automated recovery systems; thereby, removing a major roadblock currently preventing automated recovery at high sea states.

To control the bow riding behavior of the UWBV, the mother ship uses a high-frequency (HF) sonar transceiver array to compute and to send course corrections. A transmitted signal reflected from the UWBV and detected by the array enables accurate range and bearing relative to the main ship.

When the UWBV is on a course that would take the UWBV out of the bow wave region; speed and/or bearing corrections are sent via the HF array. The same signals reflected from the UWBV to determine relative range and bearing would also be encoded with guidance signals that can be detected by the UWBV receiver as the signal is reflected.

The short range allows the use of an HF array in the frequency range of 100 kHz or higher; thereby, allowing accurate bearing resolution with a comparatively very small aperture. When course corrections are sent on a near-continuous basis, each change in thrust and rudder angle will be small; thereby, allowing for accurate control of the UWBV.

In one embodiment, a method for recovering an unmanned, water-borne vehicle includes the step of sending maneuvering signals to the unmanned, water-borne vehicle in order to direct the unmanned, water-borne vehicle into a bow wave region of a ship such that the unmanned, water-borne vehicle is propelled by a pressure gradient within the bow wave region. The method further includes the step of sending course correction signals to the unmanned, water-borne vehicle. The method also maintains the unmanned, water-borne vehicle in a stable relationship with the ship based on the course correction signals; and operating a retrieval mechanism to recover the unmanned, water-borne vehicle from the bow wave region.

In one embodiment, sending course correction signals further includes the steps of sending a first signal forward and to one side of the unmanned, water-borne vehicle; and sending a second signal aft and to an opposite side of the unmanned, water-borne vehicle. Maintaining the unmanned, water-borne vehicle in a stable relationship with the ship further includes the step of turning the unmanned, water-borne vehicle in a direction away from the first or second signal when the respective first or second signal is detected by the unmanned, water-borne vehicle.

In one embodiment, sending course correction signals further includes the step of sending an attenuating signal near the ship; and maintaining further includes the step of turning the unmanned, water-borne vehicle in a direction away from the attenuating signal when the attenuating signal is detected by the unmanned, water-borne vehicle.

In one embodiment, sending course correction signals further includes the steps of receiving an echo of the course correction signals and sending adjusted course correction signals based on the echo. In one embodiment, maintaining the unmanned, water-borne vehicle in a stable relationship with the ship includes maintaining the relationship with the ship to within the operating parameters of the retrieval mechanism.

In one embodiment, maintaining the unmanned, water-borne vehicle in a stable relationship with the ship further includes the steps of sending guidance signals from the unmanned, water-borne vehicle towards the ship, receiving an echo of the guidance signals at the unmanned, water-borne vehicle and adjusting the speed, the direction, or both the speed and direction of the unmanned, water-borne vehicle based on the echo.

In one embodiment, the adjusting further includes the steps of monitoring one or more of the speed, acceleration and pressure gradient along a length of the unmanned, waterborne vehicle and further adjusting the speed and direction of the unmanned, water-borne vehicle based on the results of the monitoring.

In one embodiment, the method further includes the step of recharging a power source of the unmanned, water-borne vehicle while the unmanned, water-borne vehicle is propelled by the pressure gradient.

In one embodiment, a system for recovering an unmanned, water-borne vehicle includes a transceiver and a transceiver maneuvering signal embodied in a transmission medium and containing instructions for maneuvering the unmanned, water-borne vehicle into a bow wave region of a ship such that the unmanned, water-borne vehicle is propelled by a pressure gradient within the bow wave region.

The system also includes a transceiver course correcting signal embodied in the transmission medium and containing instructions for maintaining the unmanned, water-borne vehicle in a stable relationship with the ship. Furthermore, the system includes a retrieval mechanism to capture and remove the unmanned, water-borne vehicle from the bow wave region.

In one embodiment, the transceiver course correcting signal includes a first signal directed forward and to one side of the unmanned, water-borne vehicle, a second signal directed aft and to an opposite side of the unmanned, water-borne vehicle. The system also includes a vehicle transceiver for detecting the first and second signals and a vehicle transceiver signal embodied in a vehicle transmission medium and containing instructions to turn the unmanned, water-borne vehicle in a direction away from a detected one of the first or second signal.

In one embodiment, the system further includes a power converter for recharging a power source of the unmanned, water-borne vehicle when the unmanned, water-borne vehicle is propelled by the pressure gradient.

In one embodiment, the system further includes one or more sensors for monitoring one or more of a speed, acceleration and pressure gradient along a length of the unmanned, water-borne vehicle; and a sensor data signal embodied in a vehicle transmission medium and containing instructions to adjust one or more of the speed or direction of the unmanned, water-borne vehicle.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DETAILED DESCRIPTION OF THE INVENTION

Figure 1:
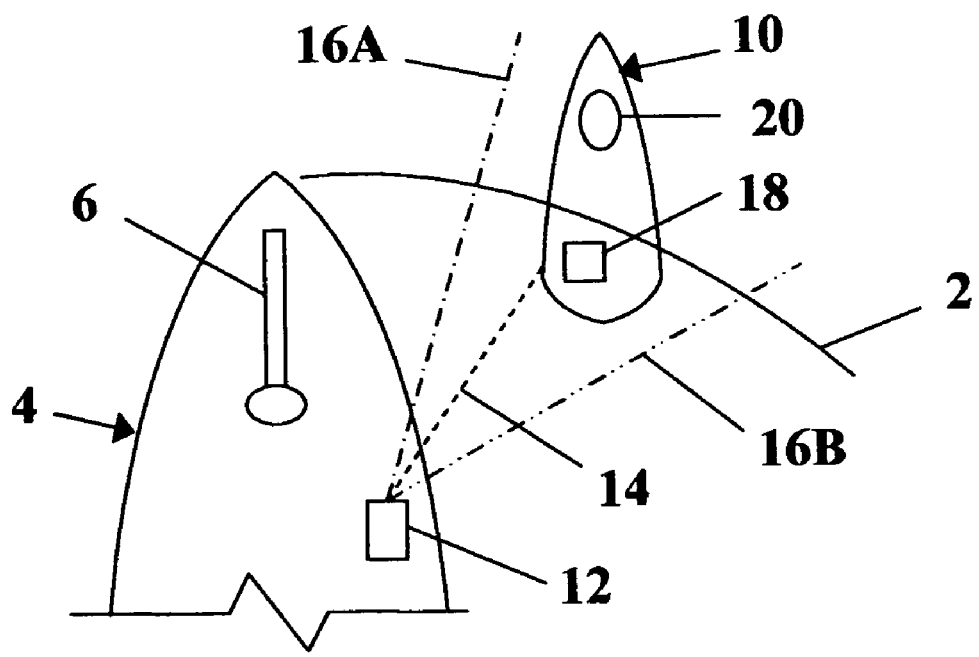
FIG. 1 depicts a schematic of a UWBV riding a bow wave.

Referring now to the drawings in detail wherein like numerals indicate like elements throughout the several views, in FIG. 1, UWBV 10 is illustrated riding in bow wave 2 of ship 4. For clarity, only one side of the bow wave 2 is illustrated in FIG. 1. The concept of the UWBV 10 riding the bow wave 2 is akin to the behavior of some species of dolphin that ride the bow waves of ships.

As is known in the art, a transiting ship creates a bow wave that generates a high pressure region. Dolphins (or porpoises) entering the bow wave region are propelled forward by the pressure gradient. For ease of depiction and description, but not limitation, this high pressure region is illustrated in FIG. 1 and is referred to herein alternately as the bow wave 2 or the bow wave region 2.

The phenomenon of bow riding occurs in small ships even when the bow wave is not visually apparent. The size of the bow wave region depends on the ship speed, size and hull design (e.g., a bulbous bow reduces the bow wave). However, even a one hundred foot long ship generates a region extending to about five feet in front of the stern and to the sides as well. Dolphins observed one to six feet below the surface exert no swimming motions at all in many cases.

To initiate bow riding, the UWBV 10 can approach the ship 4 at speed, or the ship can approach the UWBV, or some combination of both can occur. Whatever the case, the UWBV 10 maneuvers into the bow wave region 2 and then continues to make course corrections to stay in bow wave region.

Figure 2:
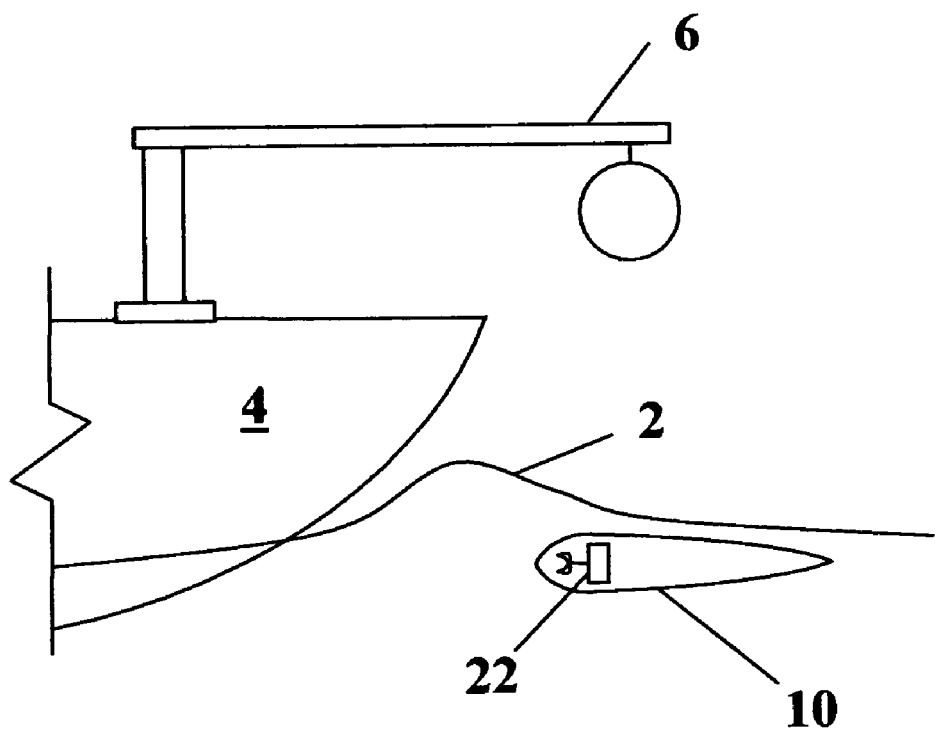
FIG. 2 depicts a schematic side view of the UWBV of FIG. 1.

Referring to FIG. 2, which illustrates a side view of the ship 4 and the UWBV 10, the ship is equipped with a retrieval mechanism 6. By the UWBV 10 remaining in the bow wave region 2, the relative motion between the UWVB and the ship is minimized. Accordingly, capture of the UWBV 10 by the retrieval mechanism 6 is facilitated.

Either or both the ship 4 and the UWBV 10 can be equipped with a sonar transceiver 12 to send and receive signals used for computation and execution of maneuvers and course corrections. For greater precision in determining maneuvers and course corrections, the transceiver 12 can be a high frequency (HF) sonar array in the frequency range of one hundred kiloHertz (kHz) or higher.

For clarity and ease of description, but not limitation, the transceiver 12 is illustrated in FIG. 1 as being aboard the ship 4. Accordingly, the following description relates to the ship 4 monitoring the position of the UWBV 10 and sending/receiving signals for controlling maneuvers and course corrections.

Alternately, and as will be described in further detail hereinafter, the systems and methods may be configured such that the UWBV 10 monitors its own position and controls maneuvers and course corrections internally rather than receiving signals from the ship 4. Additionally, the systems and methods described herein may be configured such that monitoring and control of the UWBV 10 are shared between the UWBV and the ship 4.

Referring back to FIG. 1, where the transceiver 12 is aboard the ship 4, the ship can monitor the UWBV 10 with high-frequency sonar, a camera, or by other known means. Preferably, HF acoustic beam 14 emitted by the transceiver 12, reflected by the UWBV 10 and then detected by the transceiver, is used to determine the relative range and bearing of the UWBV. The use of HF sonar enables accurate range and bearing relative to the ship 4.

The acoustic beam 14 can be encoded with guidance signals that can be detected by the UWBV 10 as the beam is reflected from the UWBV. When the UWBV 10 is not within an ideal window, the ship 4 can send the UWBV commands via the encoded guidance signals within the HF acoustic beam 14 to change course and/or to increase or decrease speed, such that the UWBV does not need a guidance system.

Alternately to encoding the acoustic beam 14 with guidance signals, or in combination therewith, transceiver 12 can send beams 16A and 16B having different frequencies. The beams 16A and 16B provide navigation cues for the UWBV 10 to assist in maintaining position within the bow wave region 2.

As an example, the beams 16A and 16B can be acoustic beams that are detected by the UWBV 10. If the UWBV 10 moves away from an optimal position within the bow wave region 2; the UWBV can begin to detect either the beam 16A or beam 16B, depending on which direction the UWBV moves. Accordingly, the UWBV 10 can be programmed to steer away from the detected beam and back towards an optimal position.

As a further example, the beam 16A can be an acoustic field, e.g., a 1 Mega-Hertz (MHz) field, or a low frequency electromagnetic field, either of which would attenuate quickly. As in the previous example, detection of the beam or field 16A by the UWBV 10 would indicate that the UWBV was approaching the ship 4 and again the UWBV can be programmed to steer away from the detected beam.

As previously noted, the UWBV 10 can be configured with a vehicle transceiver. For clarity of description, the vehicle transceiver is designated in FIG. 1 with reference numeral 18. The UWBV 10 uses the vehicle transceiver 18 for self-guidance so as to attain and maintain position in the bow region 2. In a manner similar to that described for the transceiver 12, the vehicle transceiver 18 can transmit pulses to, and receive reflections from, the ship 4 so as to estimate the separation between ship and the UWBV 10. These pulses can also be received by the transceiver 12 and used by the ship 4 to further aid in determining the position of UWBV 10.

Additionally, the UWBV 10 can be configured with non-acoustic sensors 20 for monitoring speed, acceleration, and/or pressure gradients along the length of the UWBV. The acoustic sensors 20 can further aid the UWBV 10 in maintaining an optimal position in the bow wave region 2.

Figure 3:
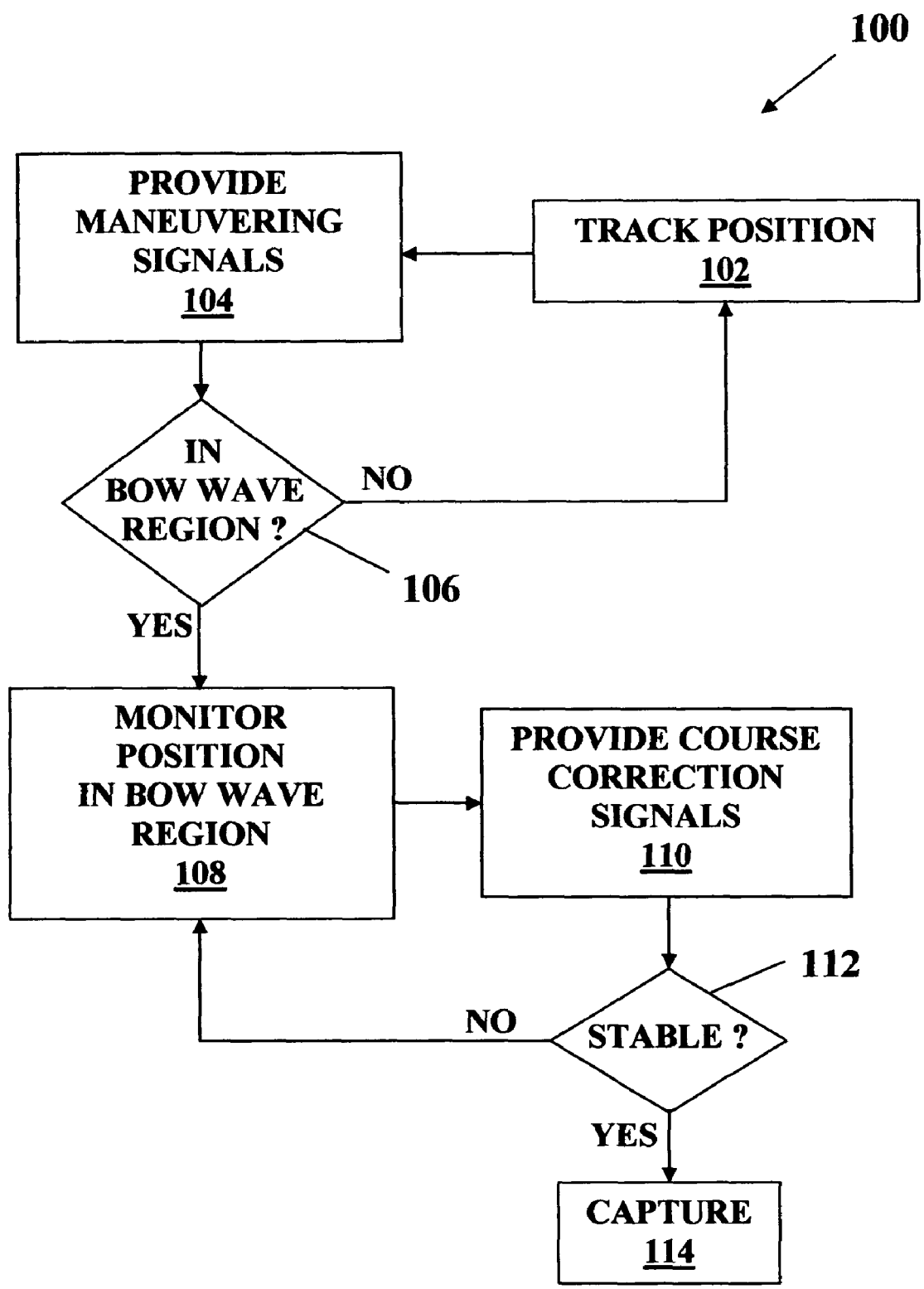
FIG. 3 depicts a block diagram of a method for recovering a UWBV.

Referring now to FIG. 3, there is shown a block diagram of a method 100 for retrieval of a UWBV, such as the UWBV 10, from a ship, such as the ship 4. At block 102, the ship 4 tracks the position of the UWBV 10 using the transceiver 12. For retrieval, the ship 4 sends signals to the UWBV 10 so as to maneuver into the bow wave region 2 of the ship, as indicated at block 104. The maneuvering signals can result in the UWBV 10 changing speed and/or direction so as to bring the UWBV to the proper position and speed within the bow wave region 2 to affect bow wave riding by the UWBV.

Once the UWBV 10 maneuvers into the bow region 2, as determined at block 106, the ship 4 monitors the position of the UWBV within the bow region using the transceiver 12, as shown by block 108. As with maneuvering the UWBV 10 into the bow wave region 2, the ship 4 sends course correction signals to the UWBV such that the UWBV maintains a position within the bow wave region, as indicated at block 110.

Block 112 determines if the UWBV 10 is stable within the bow wave region 2. The UWBV 10 can be considered stable if the maintains a position relative to the ship 4 within the tolerance, or operating parameters, of the retrieval mechanism 6. Once the UWBV 10 is stable, the retrieval mechanism 6 is operated to capture the UWVB, as indicated at block 114.

What has thus been described is a bow riding UWBV and a method for automated recovery of the UWBV from a ship. The systems and methods can be used in conjunction with existing recovery arms when sea states would otherwise preclude operation of the recovery arm. By riding the bow wave and being maintained therein, the UWBV provides a steadier target for acquisition by existing recovery arms. Additionally, when necessary to delay taking the UWBV aboard ship, the UWBV can be captured and maintained in the bow wave until such time as recovery is appropriate.

Furthermore, by riding the bow wave, the UWBV can conserve power, in that the UWBV uses energy only for course adjustments. The ship provides energy for propulsion of the UWBV via the pressure gradient in the bow wave.

Obviously many modifications and variations of the present invention may become apparent in light of the above teachings. For example, the systems and methods described herein can also be used during launch of a UWBV, allowing the UWBV to ride the bow wave until its mission begins.

As an additional example, the UWBV may be an unmanned surface vehicle riding on the surface. The methods and systems used would be similar to those described hereinbefore with radar being used for navigation instead of, or in addition to, sonar. As a still further example, the UWBV can potentially harvest energy from the bow wave pressure gradient, such as by a power converter 22, shown in FIG. 2. Thus, it could return to the bow wave to recharge batteries and then continue on mission without having to be recovered.

Thus, the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A method for recovering an unmanned, water-borne vehicle, said method comprising the steps of:
    sending maneuvering signals to the vehicle to direct the vehicle into a bow wave region of a ship such that the vehicle is propelled by a pressure gradient within the bow wave region;
    sending course correction signals to the vehicle;
    maintaining the vehicle in a stable relationship with the ship based on the course correction signals; and
    operating a retrieval mechanism on the ship to recover the vehicle from the bow wave region.

2. The method according to claim 1, wherein said sending course correction signals step further comprises:
    sending a first signal forward and to one side of the vehicle; and sending a second signal aft and to an opposite side of the vehicle; and wherein:
    said maintaining the vehicle in a stable relationship with the ship step further comprises turning the vehicle in a direction away from one of the first and second signals when a respective one of the first and second signals is detected by the vehicle.

3. The method according to claim 1, wherein said sending course correction signals step further comprises:
    sending an attenuating signal near the ship; and wherein:
    said maintaining the vehicle in a stable relationship with the ship step further comprises the step of turning the vehicle in a direction away from the attenuating signal when the attenuating signal is detected by the vehicle.

4. The method according to claim 1, wherein said sending course correction signals step further comprises:
    receiving an echo of the course correction signals; and
    sending adjusted course correction signals based on the echo.

5. The method according to claim 1, wherein said maintaining the unmanned, water-borne vehicle in a stable relationship with the ship step comprises maintaining the relationship with the ship to within operating parameters of the retrieval mechanism.

6. The method according to claim 1, wherein said maintaining the unmanned, water-borne vehicle in a stable relationship with the ship step further comprises:

sending guidance signals from the vehicle towards the ship;

receiving an echo of the guidance signals at the vehicle; and adjusting at least one of a speed and direction of the vehicle based on the echo.

7. The method according to claim 6, wherein said adjusting step further comprises:

monitoring at least one of a speed, acceleration and pressure gradient along a length of the vehicle; and further adjusting at least one of the speed and direction of the unmanned, water-borne vehicle based on said monitoring step.

8. The method according to claim 1, further comprising recharging a power source of the unmanned, water-borne vehicle during propelling of the vehicle by the pressure gradient.

9. A system for recovering an unmanned, water-borne vehicle, said system comprising:

a transceiver;

a transceiver maneuvering signal embodied in a transmission medium comprising instructions for maneuvering the vehicle into a bow wave region of a ship such that the vehicle is propelled by a pressure gradient within the bow wave region;

a transceiver course correcting signal embodied in the transmission medium, said transceiver course correcting signal comprising instructions for maintaining the vehicle in a stable relationship with the ship; and a retrieval mechanism to capture and remove the vehicle from the bow wave region.

10. The system according to claim 9, wherein said transceiver course correcting signal further comprises:

a first signal directed forward and to one side of the vehicle;

a second signal directed aft and to an opposite side of the vehicle;

a vehicle transceiver for detecting said first and second signals; and a vehicle transceiver signal embodied in a vehicle transmission medium comprising instructions to turn the vehicle in a direction away from one of said first and second signals when a respective one of said first and second signals is detected by the vehicle transceiver.

11. The system according to claim 9, further comprising a power converter for recharging a power source of the unmanned, water-borne vehicle when the vehicle is propelled by the pressure gradient.

12. The system according to claim 9, further comprising:

at least one sensor for monitoring at least one of a speed, acceleration and pressure gradient along a length of the vehicle; and a sensor data signal embodied in a vehicle transmission medium comprising instructions to adjust at least one of the speed and direction of the vehicle.

* * * * *